United States Patent [19]
von Zitzewitz et al.

[11] Patent Number: 5,199,065
[45] Date of Patent: Mar. 30, 1993

[54] METHOD FOR AUTOMATIC SPEECH DIRECTION REVERSAL, AND CIRCUIT CONFIGURATION FOR PERFORMING THE METHOD

[75] Inventors: Andreas von Zitzewitz, Maitenbeth; Siegmund Redl, Wolnzach, both of Fed. Rep. of Germany

[73] Assignee: Siemens Aktiengesellschaft, Munich, Fed. Rep. of Germany

[21] Appl. No.: 599,657

[22] Filed: Oct. 18, 1990

[30] Foreign Application Priority Data

Oct. 18, 1989 [DE] Fed. Rep. of Germany ....... 3934769

[51] Int. Cl.⁵ .............................................. H04M 1/60
[52] U.S. Cl. ..................................... 379/389; 379/388; 379/395
[58] Field of Search ............... 379/388, 389, 390, 395, 379/420, 206

[56] References Cited

U.S. PATENT DOCUMENTS

| | | | |
|---|---|---|---|
| 4,052,562 | 10/1977 | Andersen | 379/389 X |
| 4,087,636 | 5/1978 | Akiyama et al. | 379/389 X |
| 4,581,758 | 3/1986 | Coker et al. | 379/206 X |
| 5,048,082 | 10/1991 | Krafft | 379/389 |

OTHER PUBLICATIONS

German Publication: Elektronik, 22, Oct. 30, 1987, p. 87ff; Chandra Desai, "Frei sprechen ohne Rückkopplung".

*Primary Examiner*—James L. Dwyer
*Assistant Examiner*—M. Shehata
*Attorney, Agent, or Firm*—Herbert L. Lerner; Laurence A. Greenberg

[57] ABSTRACT

A method for automatic speech direction reversal includes supplying a reception signal with variable damping to a loudspeaker, outputting a microphone signal with variable damping from a microphone as a transmission signal; continuously classifying each of the reception signal and the microphone signal as a speech signal or noise; setting the damping of one of the signals classified as the speech signal to a first damping value, setting the damping of the other of the signals to a second damping value being higher than the first damping value, and maintaining the set damping until the one signal is classified as noise. The preceding damping values are maintained if both of the signals are classified as a speech signal. Both damping vlaues are set to a third damping value being located between the first and second damping values if both of the signals are classified as noise. A transition is performed from one of the first and second damping values to the third damping value more slowly than a transition from the third damping value to one of the first and second damping values, more slowly than a transition from the first to the second damping value, and more slowly than a transition from the second to the first damping value. A configuration for performing the method includes a loudspeaker, a controllable reception attenuator, a microphone, a controllable transmission attenuator, two signal/noise detectors, and a control logic.

19 Claims, 1 Drawing Sheet

METHOD FOR AUTOMATIC SPEECH DIRECTION REVERSAL, AND CIRCUIT CONFIGURATION FOR PERFORMING THE METHOD

BACKGROUND OF THE INVENTION

1. Field of the Invention

The invention relates to a method for automatic speech direction reversal and a circuit configuration for performing the method.

The convenience of telephone sets has increased markedly in recent years. In addition to automatic redialing, storage in memory of frequently called numbers and speaker phones, the option of speaking without using the handset has become a highly desired telephone feature. Besides its use in the private sector, this feature has many other valuable applications, for instance in interoffice communication, telephone conferences, car phones, or in anywhere else when holding the handset is a problem.

The basic difference between a normal telephone with a handset and a hands-free telephone is in its mode of operation: The normal phone operates in two-way operation. In other words, transmission takes place in both sending and receiving directions simultaneously. In the hands-free telephone, such operation is only possible with very complicated methods, which do not function satisfactorily. Due to the high signal amplification in both directions, any attempt at two-way conversation would immediately produce strong feedback whistling, because a closed loop is created by the acoustic coupling between the loudspeaker and the microphone. Hands-free telephones can therefore operate only in alternating or one-way operation, that is only one of the two participants can ever speak, while the other listens. Attaining such operation requires a circuit that ascertains who is speaking at a given time, in order to then connect the applicable channel and to attenuate the other channel sufficiently. Thus the loop amplification is kept below one. Once the speakers change places, the circuit must ascertain it immediately and switch over the channels accordingly. The circuit operates automatically in the hands-free mode with the aid of a speech direction recognition, combined with an electric reversing switch.

2. Description of the Related Art

A circuit configuration for automatic speech direction reversal in telephones is known, for instance, from the article by Chandra Desai entitled Frei sprechen ohne Rückkopplung [Hands-free Phoning Without Feedback] Elektronik 22, Oct. 30, 1987, pp. 87 ff., and from Motorola Semiconductors Data Sheet MC 34118.

In that circuit, which is made by analog circuitry, the channel which is not active at a given time is damped relative to the active channel. As a result, the person speaking at a given time cannot hear his partner. A so-called idle state can also be triggered, by operating both channels with half the maximum damping. In the event that neither person is speaking, or if the speaker is drowned out by the noise where the listener is located, then a slow shift to the idle state (slow idle) is made. In contrast, in the event that the speaker and the loudspeaker are at approximately the same level, a fast shift to the idle state (fast idle) is made.

The disadvantages of the known circuit are that with simultaneous speaking and listening (fast idle), the loop amplification can only be kept less than one by means of additional, complicated provisions, and the circuitry is costly as a whole.

SUMMARY OF THE INVENTION

It is accordingly an object of the invention to provide a method for automatic speech direction reversal and a circuit configuration for performing the method, which overcome the hereinafore-mentioned disadvantages of the heretofore-known methods and devices of this general type.

With the foregoing and other objects in view there is provided, in accordance with the invention, a method for automatic speech direction reversal, which comprises supplying a reception signal with variable damping to a loudspeaker; outputting a microphone signal with variable damping from a microphone as a transmission signal; continuously classifying each of the reception signal and the microphone signal as a speech signal or noise; setting the damping of one of the signals classified as the speech signal to a first damping value, setting the damping of the other of the signals to a second damping value being higher than the first damping value, and maintaining the set damping until the one signal is classified as noise; maintaining preceding damping values if both of the signals are classified as a speech signal; setting both damping values to a third damping value being located between the first and second damping values if both of the signals are classified as noise; and performing a transition from one of the first and second damping values to the third damping value more slowly than a transition from the third damping value to one of the first and second damping values, more slowly than a transition from the first to the second damping value, and more slowly than a transition from the second to the first damping value.

In accordance with another mode of the invention, there is provided a method which comprises after a change from a speech signal to a noise in at least one of the reception and microphone signals, performing a transition from at least one of the first and second damping values to the third damping value after a predetermined delay period has elapsed.

In accordance with a further mode of the invention, there is provided a method which comprises classifying the reception signal and the microphone signal as a speech signal or noise by quantifying the applicable signal, amplitude companding, low-pass filtering a first time with a given time constant, low-pass filtering a second time with a given time constant, comparing the signal prior to the second low-pass filtration, minus an adjustable offset signal, with the signal after the second low-pass filtration, and, selectively classifying the signal as a speech signal if the signal prior to the second low-pass filtration, minus the offset signal, predominates or classifying the signal as noise if the signal after the second low-pass filtration predominates.

In accordance with an added mode of the invention, there is provided a method which comprises after the first low-pass filtration, performing a peak value detection with two alternative fading time constants; providing two alternative higher and lower time constants in the second low-pass filtration; setting the higher time constant for peak value detection and for the second low-pass filtration upon classification of the signal as a speech signal, and setting the lower time constant for peak value detection and for the second low-pass filtration upon classification of the signal as noise.

In accordance with an additional mode of the invention, there is provided a method which comprises setting the given time constant of the first low-pass filtration higher for the microphone signal than that for the reception signal.

In accordance with yet another mode of the invention, there is provided a method which comprises setting an internal state for one of the microphone and reception signals in the second low-pass filtration to an amplitude value being higher than the instantaneous amplitude value of the applicable signal, if the classification of one of the reception and microphone signals changes from a speech signal to noise, and the applicable signal is classified as noise.

In accordance with yet a further mode of the invention, there is provided a method which comprises setting the internal state in the second low-pass filtration to a maximum amplitude value.

In accordance with yet an added mode of the invention, there is provided a method which comprises feeding the microphone and reception signals as input signals to respective signal/noise detectors having offset signals, and increasing the offset signal of one of the signal/noise detectors if the other of the signal/noise detectors classifies its input signal as a speech signal.

In accordance with yet an additional mode of the invention, there is provided a method which comprises maintaining at least one of the offset signal and an instantaneous amplitude value of the other of the signal/noise detectors for a predetermined period of time, after the transition from speech to noise in one of the signal/noise detectors.

In accordance with again another mode of the invention, there is provided a method which comprises processing the signals in a time and amplitude-discrete manner.

In accordance with again a further mode of the invention, there is provided a method which comprises processing the signals in a time and amplitude-discrete manner, multiplying the time and amplitude-discrete signals to be filtered by a predetermined factor, adding the time and amplitude-discrete signals to be filtered to the delayed and filtered time and amplitude-discrete signals for at least one low-pass filtration, and subtracting the filtered, multiplied by the predetermined factor, and delayed signal therefrom.

In accordance with again an added mode of the invention, there is provided a method which comprises setting the predetermined factor equal to an $n^{th}$ power of 2, and optionally shifting by small n places instead of multiplying.

In accordance with again an additional mode of the invention, there is provided a method which comprises performing a transition from the second damping value to the third damping value by continuous subtraction of the instantaneous damping value being shifted arithmetically to the right by k places, from the instantaneous value until the third damping value is attained, and performing a transition from the first damping value to the third damping value by continuous addition of the instantaneous value being shifted arithmetically to the right by k places, until the third damping value is attained.

With the objects of the invention in view, there is also provided a circuit configuration for automatic speech direction reversal, comprising a loudspeaker; a controllable reception attenuator having an input receiving a reception signal and an output supplying a signal to the loudspeaker for triggering the loudspeaker; a microphone supplying a microphone signal; a controllable transmission attenuator having an input receiving the microphone signal and an output supplying a transmission signal; two signal/noise detectors, one of the signal/noise detectors receiving one of the reception and loudspeaker signals, and the other of the signal/noise detectors receiving one of the microphone and transmission signals; and a control logic connected downstream of the signal/noise detectors and upstream of the reception and transmission attenuators for controlling the reception and transmission attenuators.

In accordance with another feature of the invention, each of the signal/noise detectors includes an input, a rectifier connected to the input, a compander connected downstream of the rectifier, a first low-pass filter connected downstream of the compander, a second low-pass filter connected downstream of the first low-pass filter for receiving an input signal and supplying an output signal, an evaluation circuit, and an output connected to the evaluation circuit, the evaluation circuit receiving the input signal of the second low-pass filter, minus a controllable offset signal and minus the output signal of the second low-pass filter.

In accordance with a concomitant feature of the invention, the second low-pass filter in each of the signal/noise detectors has an adjustable time constant and a control input; each of the signal/noise detectors include a peak value detector connected downstream of the first low-pass filter having an adjustable fading time constant and a control input; and the control inputs of the peak value detector and the second low-pass filter are connected to the evaluation circuit for time constant adjustment.

Other features which are considered as characteristic for the invention are set forth in the appended claims.

Although the invention is illustrated and described herein as embodied in a method for automatic speech direction reversal and a circuit configuration for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
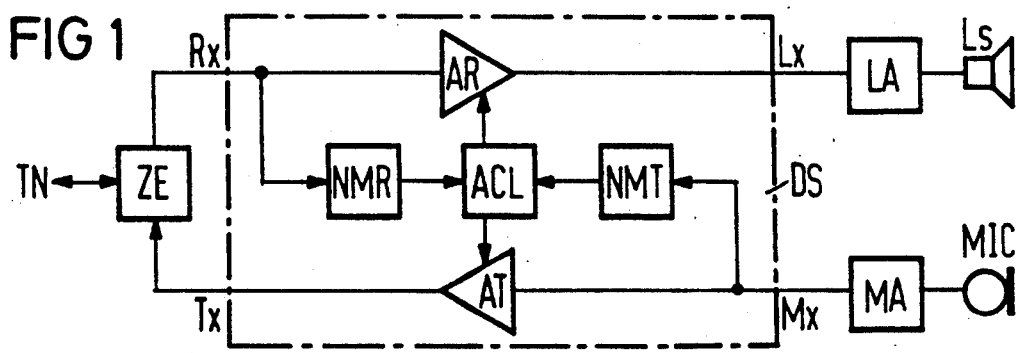
FIG. 1 is a block circuit diagram of an exemplary embodiment of a circuit configuration according to the invention, in terms of which the basic course of performing the method will be explained.

Referring now to the figures of the drawing in detail and first, particularly, to FIG. 1 thereof, there is seen an exemplary embodiment in which signals transmitted bidirectionally over a telephone line are split in a circulator device ZE into a reception signal Rx and a transmission signal Tx. The reception and transmission signals Rx, Tx are supplied and taken from an automatic speech direction reversal device DS according to the invention. A loudspeaker LS, to which a signal Lx is delivered, is connected to the speech direction reversing device DS through a loudspeaker adaptor LA. A microphone MIC, which outputs a signal Mx, is also connected to the speech direction reversing device DS through a microphone adaptor MA. The speech direction reversal device DS has a controllable reception attenuator AR with an input to which the reception signal Rx is applied and an output at which the signal Lx is present. The speech direction reversal device DS also has a controllable transmission attenuator AT with an input to which the signal Mx is applied and an output at which the transmission signal Tx is present. In order to control the reception and transmission attenuators AR, AT, a control logic ACL is provided, which is triggered in turn by two signal/noise detectors NMR, NMT. One signal/noise detector NMR is acted upon by the reception signal Rx, and the other signal/noise detector NMT is acted upon by the signal Mx. In principle, however, it is also possible to trigger the signal/noise detectors NMR, NMT with the signal Lx or the transmission signal Tx, since the signal Lx is proportional to the reception signal Rx, and the transmission signal Tx is proportional to the signal Mx.

The method according to the invention provides for the reception signal Rx to be delivered with variable damping to the loudspeaker LS in the form of the signal Lx, and for the signal Mx to likewise be used with variable damping, as the transmission signal Tx. The adjustment of the damping at a given time is effected as a function of the reception signal Rx and the signal Mx. To this end, both signals are classified continuously as either a speech signal or noise. In the event that one of the two signals has been classified as a speech signal, then the damping of that signal is set to a first damping value D1, the other signal is set to a second damping value D2, and these are maintained until such time as one signal is classified as noise again. If both signals are classified as speech signals, then the damping of both is adjusted in accordance with the first signal recognized as speech. In the event that both signals are classified as noise, then the damping of both is set to a third damping value D3, which is between the first and second damping values. The transition from the first or second damping value D1, D2 to the third damping value D3 is effected more slowly than a transition from the third damping value D3 to the first or second damping value D1, D2, or than a transition from the first damping value D1 to the second damping value D2, and vice versa. This situation is shown in the form of a graph in FIG. 2. The signal Mx is first shown as a speech signal, and the reception signal Rx is shown classified as noise. The damping of the signal Rx is therefore equal to the second damping value D2, the damping of the signal Mx is equal to the first damping value D1, and D1 is equivalent to zero damping. The damping is adjusted accordingly by the reception attenuator AR for the reception signal Rx and by the transmission attenuator AT for the signal Mx. At a time T1, the signal Mx changes, so that both signal/noise detectors NMR, NMT then classify the applicable signals Rx, Mx as noise. The transition of the damping from the value D2 to the value D3 for the reception signal Rx, and the transition of the damping from the value D1 to the value D3 for the signal Mx, take place continuously up to a time T3, at which both damping values remain until a time T4. At the time T4, the signal Mx is in fact recognized as a speech signal again. The damping of the signal Mx is thereupon brought to the damping value D1, and the reception signal Rx is brought to the value D2, in both cases with a steep slope. At a time T5, the speech direction changes, so that the damping values reverse accordingly.

According to a feature of the invention, the transition of the damping values dictated by the signal change at the time T1, takes place only after a given delay time has elapsed, at the time T2, if the reception signal Rx and the signal Mx were classified as noise at the time T1. The duration of the transition may be retained unchanged, or may persist for a shorter time, as shown.

In order to classify the reception signal Rx and the signal Mx as a speech signal or noise, the application signal Rx, Mx is first rectified and an amplitude companding is thereupon performed. After a first low-pass filtration with a predetermined time constant, a peak value detection with two alternative fading time constants, and a second low-pass filtration with two alternative time constants, a comparison of the signal after the peak value detection, minus an offset signal, with the signal after the second low-pass filtration is performed. The classification of the signal as a speech signal, and an associated setting of the higher time constant upon peak value detection and second low-pass filtration, results from the predominance of the signal after the peak value detection minus the offset signal, compared with the signal after the second low-pass filtration. If the situation is the reverse, then the signal is classified as noise, and the lower time constant is set in the peak value detection and the second low-pass filtration. For numerous applications, it is also possible to dispense with peak value detection and a reversal of time constant for the second low-pass filtration.

The classification of the speech signal and noise is based on the fact that speech signals generally have a chronologically highly structured envelope curve, with pronounced amplitude fluctuations, and can therefore be considered approximately as signals in pulse form, while noise is predominantly relatively uniform, stationary signals. Accordingly, in order to distinguish a pulsed nature from uniformity, the signal to be examined is firstly carried through a low-pass-filtered branch (second low-pass filtration) and secondly through a direct branch, in which only an offset signal, preferably a direct signal, is subtracted from the signal. Signals in pulse form are damped more markedly in one branch than the uniform ones, because of the low-pass filtration.

In the second branch, the type of signal does not matter. Thus a distinction can be made when the two branches are compared, because with pulsed signals the first branch furnishes a lower value than the second, and the situation is the reverse for uniform signals. Due to the preceding low-pass filtration, in which brief noise pulses are suppressed by the low-pass filtration (first low-pass filtration), the signals become more pronounced in their structure and can be distinguished more easily. The amplitude companding increases the sensitivity at low modulation, so that the signal/noise detector responds faster. Further improvement is attained, according to a further feature of the invention, by the peak value detection and the reversal of the time constants in the peak value detection and second low-pass filtration, because a lower time constant is used for uniform than for pulsed signals. As a result, a change from noise to a speech signal is recognized immediately, while in the reverse case the observation time is longer, so that relatively brief pauses in speech will not cause a reversal.

Figure 3:
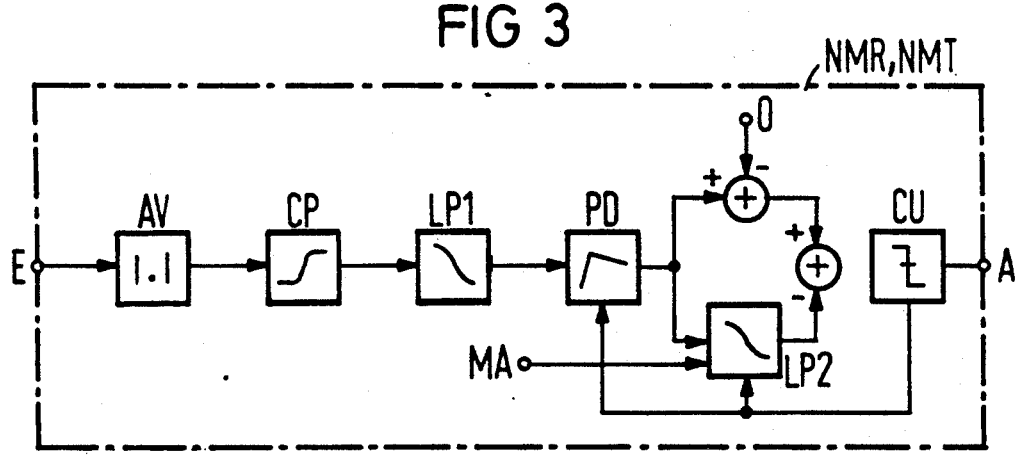
FIG. 3 is a schematic and block circuit diagram of an exemplary embodiment of a circuit configuration being used to explain the course of performing the method according to the invention for distinguishing between speech and noise.

To this end, as FIG. 3 shows, the present exemplary embodiment is provided with a signal/noise detector NMR, NMT including a rectifier AV at an input E, followed by a compander CP, followed in turn by a first low-pass filter LP1, a peak value detector PD with an adjustable time constant being connected to the first low-pass filter LP1, and finally a second low-pass filter LP2 with an adjustable time constant that is connected to the peak value detector PD. An evaluation circuit CU at an output A receives an output signal of the peak value detector PD, minus an offset signal 0 and minus an output signal of the second low-pass filter LP2, also controls the time constants of the peak value detector PD and the second low-pass filter LP2, through one output of the evaluation circuit.

According to a further feature of the invention, the time constant of the first low-pass filter LP1 in the signal/noise detector NMT for the signal Mx is higher than that of the first low-pass filter LP1 in the signal/-noise detector NMR for the reception signal Rx. The advantage of this is that the interfering influence of echoes arising along the transmission path between the loudspeaker LS and the microphone MIC is lessened.

Furthermore, in the case of the signal MX or the reception signal Rx, the signal preceding the second low-pass filtration is set at a higher value than the instantaneous amplitude value if the classification of the other signal, that is the reception signal Rx or the signal Mx, respectively, changes from a speech signal to noise. A preferred value for this is the maximum displayable amplitude value. As a result, a longer delay time is advantageously attained, for suppression of interfering echoes.

Another feature of the invention provides that the offset signal 0 is adjustable separately for the two signal/noise detectors NMR, NMT. In the exemplary embodiment according to the invention which is shown, the offset signal 0 of one signal/noise detector is set higher for a predetermined period of time, if the other signal/noise detector has classified its input signal as a speech signal. This suppresses interfering echoes even more effectively. In order to suppress interference after the transition from speech to noise for one signal/-noise detector, it is also advantageous to retain the offset signal 0 and/or the instantaneous amplitude value of the other signal/noise detector for a certain period of time.

Preferably, the method of the invention is performed by time and amplitude-discrete signal processing. The advantages of this are accurate replicability without parameter deviations, greater capacity for integration with less external wiring, and greater compatibility with digital communications networks, such as ISDN (Integrated Services Digital Network) systems. In the exemplary embodiment shown, the transmission and reception signals Tx, Rx, like the signals Mx, Lx, are digital. The microphone adaptor MA and the loudspeaker adaptor LA are thus provided, among other elements, for analog-to-digital and digital-to-analog conversion.

In a time and amplitude-discrete system, a low-pass filtration is, for instance, performed as follows: The digital signal to be filtered is multiplied by a constant factor a and added to the digital signal, the latter having been filtered and delayed by a time value that is equal to the inverse of the cycle. From that the delayed and by a constant factor a multiplied filtered signal is subtracted and represents the output signal. Preferably, the factor a is selected to be equal to an $n^{th}$ power of 2, so that instead of multiplication, operations of shifting by n places, which are much simpler to do, can be performed.

Figure 4:
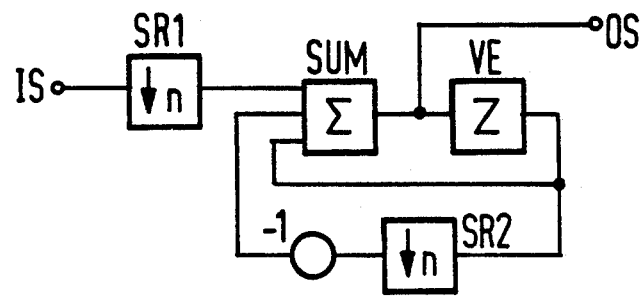
FIG. 4 is a block circuit diagram of a preferred embodiment of a low-pass filter in a circuit configuration for performing the method according to the invention.

A circuitry embodiment is shown in FIG. 4. A signal IS to be filtered is delivered to a first shift register SR1 and shifted arithmetically to the right by n places. The output of the shift register SR1 is carried to a summer SUM which is also connected to the output of a delay element VE and through an algebraic sign reverser $-1$ to the output of a second shift register SR2. The input of the second shift register SR2 is connected to the output of the delay element VE and is provided for the arithmetic shift of this signal to the right by n places. The delay element VE is triggered by the output of the summer SUM, which carries an output signal OS. A time constant TC of this kind of filter stage is calculated as a function of the number of shifted places n and as a function of a time value DT, which is equal to the inverse value of the cycle, as follows:

$$TC=DT/[-1n(1-a)],$$

where $a=2^{-n}$.

Figure 2:
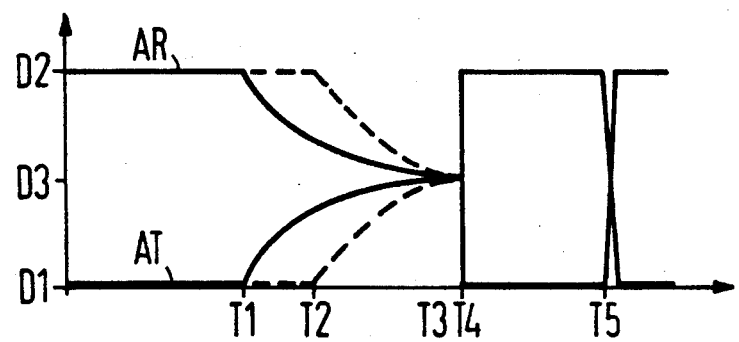
FIG. 2 is a diagram showing the damping course produced by the method according to the invention.

In FIG. 2, a transition from the damping value D2 to the value D3 is effected, for instance, by continuous subtraction of the instantaneous value, being arithmetically shifted to the right by k places, of the damping from the instantaneous value until the lower damping value is reached, and a transition from the damping value D1 to a value D3 is effected by continuous addition of the instantaneous value, being shifted arithmetically to the right by k places, until the higher damping value D2 or D3 is reached. Once again it is advantageous for multiplication to be unnecessary. However, other embodiments are equally possible in principle.

The method of the invention assures that the loop amplification is less than 1 in any operating mode, particularly when both speakers are active. As compared with known circuits, however, a considerably lesser expense for circuitry is necessary in the method of the invention than in known methods. The slow, continuous transition to an intermediate damping value located between the two extreme values makes an acceptable impression on the listener when a change from a speech signal to a noise occurs. This is further improved by an additional delay period between the signal change and the change in damping if no other speaker begins to speak, and by provisions that prevent a reversal from being caused by echoes.

We claim:

1. Method for automatic speech direction reversal, which comprises:

supplying a reception signal with variable damping to a loudspeaker, outputting a microphone signal with variable damping from a microphone as a transmission signal;

continuously classifying each of the reception signal and the microphone signal as a speech signal or noise;

setting the damping of one of the reception and microphone signals classified as the speech signal to a first damping value, setting the damping of the other of the reception and microphone signals to a second damping value being higher than the first damping value, and maintaining the set damping until the one signal is classified as noise;

setting the damping of both of the reception and microphone signals to the first damping value if both of the reception and microphone signals are classified as a speech signal;

setting both damping values to a third damping value being located between the first and second damping values if both of the reception and microphone signals are classified as noise; and performing a transition from one of the first and second damping values to the third damping value more slowly than a transition from the third damping value to one of the first and second damping values, more slowly than a transition from the first to the second damping value, and more slowly than a transition from the second to the first damping value.

2. Method according to claim 1, which comprises after a change from a speech signal to a noise in at least one of the reception and microphone signals, performing a transition from at least one of the first and second damping values to the third damping value after a predetermined delay period has elapsed.

3. Method according to claim 1, which comprises classifying the reception signal and the microphone signal as a speech signal or noise by:
rectifying the signal to be classified
amplitude companding
low-pass filtering a first time with a given time constant
low-pass filtering a second time with a given time constant
comparing the signal to be classified prior to the second low-pass filtration, minus an adjustable offset signal, with the signal to be classified after the second low-pass filtration, and
selectively
classifying the signal as a speech signal if the signal to be classified prior to the second low-pass filtration, minus the offset signal, predominates and
classifying the signal to be classified as noise if the signal after the second low-pass filtration predominates.

4. Method according to claim 3, which comprises after the first low-pass filtration, performing a peak value detection with two alternative fading time constants;
providing two alternative higher and lower time constants in the second low-pass filtration;
setting the higher time constant for peak value detection and for the second low-pass filtration upon classification of the signal as a speech signal, and
setting the lower time constant for peak value detection and for the second low-pass filtration upon classification of the signal as noise.

5. Method according to claim 3, which comprises setting the given time constant of the first low-pass filtration higher for the microphone signal than that for the reception signal.

6. Method according to claim 4, which comprises setting the given time constant of the first low-pass filtration higher for the microphone signal than that for the reception signal.

7. Method according to claim 3, which comprises setting an internal state for one of the microphone and reception signals in the second low-pass filtration to an amplitude value being higher than the instantaneous amplitude value of the applicable signal, if the classification of one of the reception and microphone signals changes from a speech signal to noise, and the applicable signal is classified as noise.

8. Method according to claim 7, which comprises setting the internal state in the second low-pass filtration to a maximum amplitude value.

9. Method according to claim 3, which comprises feeding the microphone and reception signals as input signals to respective signal/noise detectors having offset signals, and increasing the offset signal of one of the signal/noise detectors if the other of the signal/noise detectors classifies its input signal as a speech signal.

10. Method according to claim 9, which comprises maintaining at least one of the offset signal and an instantaneous amplitude value of the other of the signal/noise detectors for a predetermined period of time, after the transition from speech to noise in one of the signal/noise detectors.

11. Method according to claim 1, which comprises processing the signals in a time and amplitude-discrete manner.

12. Method according to claim 10, which comprises processing the signals in a time and amplitude-discrete manner, multiplying the time and amplitude-discrete signals to be filtered by a predetermined factor, adding the time and amplitude-discrete signals to be filtered to the delayed and filtered time and amplitude-discrete signals for at least one low-pass filtration, and subtracting the filtered, multiplied and delayed signal therefrom.

13. Method according to claim 12, which comprises setting the predetermined factor equal to an $n^{th}$ power of 2.

14. Method according to claim 10, which comprises processing the signals in a time and amplitude-discrete manner, shifting the time and amplitude-discrete signals to be filtered by a predetermined factor of small n places, adding the time and amplitude-discrete signals to be filtered to the delayed and filtered time and amplitude-discrete signals for at least one low-pass filtration, subtracting the filtered, shifted and delayed signal therefrom, and setting the predetermined factor equal to an $n^{th}$ power of 2.

15. Method according to claim 1, which comprises performing a transition from the second damping value to the third damping value by continuous subtraction of the instantaneous damping value being shifted arithmetically to the right by k places, from the instantaneous value until the third damping value is attained, and performing a transition from the first damping value to the third damping value by continuous addition of the instantaneous value being shifted arithmetically to the right by k places, until the third damping value is attained.

16. Method according to claim 1, which comprises processing the signals in a time and amplitude-discrete manner, multiplying the time and amplitude-discrete signals to be filtered by a predetermined factor, adding the time and amplitude-discrete signals to be filtered to the delayed and filtered time and amplitude-discrete signals for at least one low-pass filtration, subtracting the filtered, multiplied and delayed signal therefrom, performing a transition from the second damping value to the third damping value by continuous subtraction of an instantaneous damping value being shifted arithmetically to the right by k places, from the instantaneous value until the third damping value is attained, and performing a transition from the first damping value to the third damping value by continuous addition of the instantaneous value being shifted arithmetically to the right by k places, until the third damping value is attained.

17. Circuit configuration for automatic speech direction reversal, comprising a loudspeaker; a controllable reception attenuator having an input receiving a reception signal and an output supplying a signal to said loudspeaker for triggering said loudspeaker; a microphone supplying a microphone signal; a controllable transmission attenuator having an input receiving the microphone signal and an output supplying a transmission signal; two signal/noise detectors, one of said signal/noise detectors receiving one of the reception and loudspeaker signals, and the other of said signal/noise detectors receiving one of the microphone and transmission signals; and a control logic connected downstream of said signal/noise detectors and upstream of said reception and transmission attenuators for controlling said reception and transmission attenuators.

18. Circuit configuration according to claim 17, wherein each of said signal/noise detectors includes an input, a rectifier connected to the input, a compander connected downstream of said rectifier, a first low-pass filter connected downstream of said compander, a second low-pass filter connected downstream of said first low-pass filter for receiving an input signal and supplying an output signal, an evaluation circuit, and an output connected to said evaluation circuit, said evaluation circuit receiving the input signal of said second low-pass filter, minus a controllable offset signal and minus the output signal of said second low-pass filter.

19. Circuit configuration according to claim 18, wherein said second low-pass filter in each of said signal/noise detectors has an adjustable time constant and a control input; each of said signal/noise detectors include a peak value detector connected downstream of said first low-pass filter having an adjustable fading time constant and a control input; and the control inputs of the peak value detector and said second low-pass filter are connected to said evaluation circuit for time constant adjustment.

* * * * *